United States Patent
Cho et al.

(10) Patent No.: US 9,613,238 B2
(45) Date of Patent: Apr. 4, 2017

(54) NEAR FIELD COMMUNICATION DEVICE AND ELECTRONIC SYSTEM HAVING THE SAME

(71) Applicant: Samsung Electronics Co., Ltd., Gyeonggi-do (KR)

(72) Inventors: Jong-Pil Cho, Gyeonggi-do (KR); Jun-Ho Kim, Gyeonggi-do (KR); Il-Jong Song, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 30 days.

(21) Appl. No.: 14/591,510

(22) Filed: Jan. 7, 2015

(65) Prior Publication Data

US 2015/0261984 A1    Sep. 17, 2015

(30) Foreign Application Priority Data

Mar. 14, 2014    (KR) .................. 10-2014-0030060

(51) Int. Cl.
  *G06K 7/00*    (2006.01)
  *G06K 7/10*    (2006.01)

(52) U.S. Cl.
  CPC ..... *G06K 7/10237* (2013.01); *G06K 7/10158* (2013.01); *G06K 7/10475* (2013.01)

(58) Field of Classification Search
  CPC ......... G06K 7/008; G06K 7/013; G06K 7/086
  USPC .............................. 235/439, 462.46, 472.02
  See application file for complete search history.

(56) References Cited

U.S. PATENT DOCUMENTS

| | | | |
|---|---|---|---|
| 7,248,834 B2 | 7/2007 | Matsuo et al. | |
| 8,140,010 B2 | 3/2012 | Symons et al. | |
| 8,417,184 B2 | 4/2013 | Takayama et al. | |
| 8,437,696 B2 | 5/2013 | Audic | |
| 2008/0207128 A1 | 8/2008 | Mikko | |
| 2012/0202423 A1 | 8/2012 | Tiedemann et al. | |
| 2012/0329391 A1 | 12/2012 | Hall et al. | |
| 2013/0078914 A1 | 3/2013 | Royston et al. | |
| 2013/0140906 A1* | 6/2013 | Tanabe ............... | H02J 17/00 307/104 |
| 2013/0225071 A1 | 8/2013 | Royston et al. | |
| 2013/0237150 A1 | 9/2013 | Royston | |
| 2014/0106669 A1* | 4/2014 | Krishnan ............ | H04B 5/00 455/41.1 |

FOREIGN PATENT DOCUMENTS

| | | |
|---|---|---|
| JP | 5282498 | 3/2010 |
| KR | 10-0648853 | 11/2006 |

\* cited by examiner

*Primary Examiner* — Daniel St Cyr
(74) *Attorney, Agent, or Firm* — The Farrell Law Firm, P.C.

(57) ABSTRACT

A Near Field Communication (NFC) device, system, and method are disclosed. The NFC device includes a resonance unit configured to emit a first electromagnetic wave to communicate with an external NFC card in a reader mode, and an NFC chip configured to measure an antenna voltage generated by the resonance unit while the resonance unit emits the first electromagnetic wave, and configured to control the resonance unit to stop emitting the first electromagnetic wave when a magnitude of the antenna voltage oscillates.

19 Claims, 12 Drawing Sheets

NEAR FIELD COMMUNICATION DEVICE AND ELECTRONIC SYSTEM HAVING THE SAME

PRIORITY

This application claims priority under 35 USC §119(a) to a Korean Patent Application filed on Mar. 14, 2014 in the Korean Intellectual Property Office and assigned Serial No. 10-2014-0030060, the entire contents of which are incorporated herein by reference.

BACKGROUND

1. Field of the Invention

The present invention relates generally to a wireless communication technology, and more particularly, to a Near Field Communication (NFC) device and an electronic system including the NFC device.

2. Description of the Related Art

Recently, Near Field Communication (NFC) technology, which is a wireless communication technology, has been extensively employed in mobile devices.

An NFC device can operate in reader mode (i.e., operates as an NFC reader for contactlessly reading a smart card) or in a card mode (i.e., operates as a smart card, which is commonly referred to as an NFC card). In reader mode, an NFC device emits an electromagnetic wave to communicate with an external NFC card. An antenna voltage is generated in a resonance unit of an NFC device, when the NFC device emits an electromagnetic wave.

When an external NFC reader or NFC card is in the vicinity of an NFC device operating in reader mode such that an electromagnetic wave emitted from the external NFC reader is received by the NFC device while the NFC device is emitting an electromagnetic wave, a collision occurs between the electromagnetic waves. In this case, errors may occur in the communication between the NFC device and the external NFC reader, and the antenna voltage in a resonance unit of the NFC device may increase to where the NFC device may be damaged.

SUMMARY

The present invention has been made to address the above-mentioned problems and disadvantages, and to provide at least the advantages described below. Accordingly, an aspect of the present invention provides a Near Field Communication (NFC) device, system, and method operating in reader mode that detects when an NFC card approaches or recedes from the NFC device and when an external NFC reader is in the vicinity of the NFC device.

In accordance with an aspect of the present invention, an NFC device is provided. The NFC device includes a resonance unit configured to emit a first electromagnetic wave to communicate with an external NFC card in a reader mode, and an NFC chip configured to measure an antenna voltage generated by the resonance unit while the resonance unit emits the first electromagnetic wave, and configured to control the resonance unit to stop emitting the first electromagnetic wave when a magnitude of the antenna voltage oscillates.

In accordance with another aspect of the present invention, an electronic system is provided. The electronic system includes an NFC device configured to communicate with an external device through NFC, a memory device configured to store output data and input data, and an application processor configured to control operations of the NFC device and the memory device, wherein the NFC device includes a resonance unit configured to emit an electromagnetic wave to transmit the output data to an external NFC card and to receive the input data from the external NFC card in a reader mode, and an NFC chip configured to measure an antenna voltage generated by the resonance unit while the resonance unit emits the electromagnetic wave, and configured to control the resonance unit to stop emitting the electromagnetic wave when a magnitude of the antenna voltage oscillates.

In accordance with another aspect of the present invention, an NFC method is provided. The NFC method includes emitting, by a resonance unit, a first electromagnetic wave to communicate with an external NFC card in a reader mode; and measuring, by an NFC chip, an antenna voltage generated by the resonance unit while the resonance unit emits the first electromagnetic wave, and configured to control the resonance unit to stop emitting the first electromagnetic wave when a magnitude of the antenna voltage oscillates.

BRIEF DESCRIPTION OF THE DRAWINGS

The foregoing and other aspects, features, and advantages of the present invention will be more apparent from the following description, taken in conjunction with the accompanying drawings, in which.

DETAILED DESCRIPTION OF EMBODIMENTS OF THE PRESENT INVENTION

Figure 1:
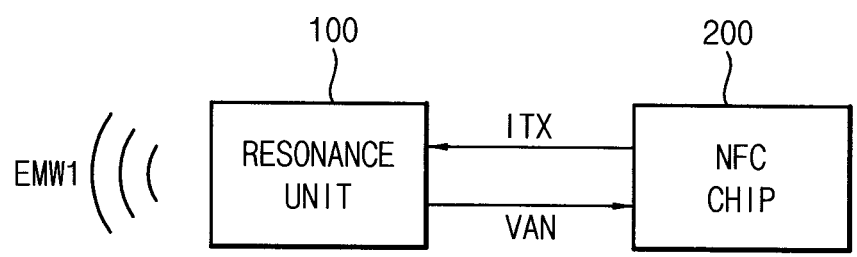
FIG. 1 is a block diagram illustrating a Near Field Communication (NFC) device according to an embodiment of the present invention.

Embodiments of the present invention are described more fully below with reference to the accompanying drawings. The present invention may, however, be embodied in many different forms and should not be construed as limited to the embodiments set forth herein. Rather, these embodiments are provided to fully convey the scope of the present inventive concept. Like reference numerals refer to like elements throughout the drawings.

It will be understood that, although the terms first, second, etc. may be used herein to describe various elements, these elements should not be limited by these terms. These terms are used to distinguish one element from another. For example, a first element may be referred to as a second element, and, similarly, a second element may be referred to as a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing embodiments and is not intended to be limiting of the present invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which the present invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating a Near Field Communication (NFC) device 10 according to an embodiment of the present invention.

The NFC device 10 illustrated in FIG. 1 communicates with an external device through an NFC scheme. In an embodiment of the present invention, the NFC device 10 detects whether a smart card (i.e., an NFC card) is near the NFC device 10, and alternately, detects whether an NFC reader (i.e., a device for contactlessly reading a smart card) is near the NFC device 10.

When the NFC device 10 detects an NFC reader near the NFC device 10, the NFC device 10 operates in a card mode, in which the NFC device 10 operates as a smart card. In card mode, the NFC device 10 communicates data (e.g., transmits and receives data) with the NFC reader using an electromagnetic wave emitted from the NFC reader.

When the NFC device 10 detects an NFC card near the NFC device 10, the NFC device 10 operates in a reader mode, in which the NFC device 10 operates as a reader. In reader mode, the NFC device 10 emits an electromagnetic wave to communicate data with the NFC card.

Referring to FIG. 1, the NFC device 10 includes a resonance unit 100 and an NFC integrated circuit, or chip, 200.

The resonance unit 100 includes a resonance circuit that includes an antenna having an inductance and a resonance capacitance.

In reader mode, the resonance unit 100 emits a first electromagnetic wave EMW1 to communicate with an external NFC card. Since the external NFC card includes a resonance circuit that includes an antenna having an inductance and a resonance capacitance, a mutual induction occurs between the resonance unit 100 and the external NFC card, when the external NFC card is located near the resonance unit 100, while the resonance unit 100 emits the first electromagnetic wave EMW1. In this case, an antenna voltage VAN is generated at the resonance circuit of the resonance unit 100 through the mutual induction with the external NFC card.

The NFC chip 200 measures the antennal voltage VAN generated by the resonance unit 100 while the resonance unit 100 emits the first electromagnetic wave EMW1, and determines whether an external NFC reader is in the vicinity of the NFC device 10, based on a magnitude of the antenna voltage VAN. When the magnitude of the antenna voltage VAN oscillates while the resonance unit 100 emits the first electromagnetic wave EMW1, the NFC chip 200 determines when the external NFC reader is in the vicinity of the NFC device 10 and then controls the resonance unit 100 to stop emitting the first electromagnetic wave EMW1. Then, the NFC chip 200 operates in card mode.

In an embodiment of the present invention, in reader mode, the NFC chip 200 provides an output current ITX to the resonance unit 100, and the resonance unit 100 emits the first electromagnetic wave EMW1 based on the output current ITX to communicate data with the external NFC card. The NFC chip 200 measures the antenna voltage VAN generated by the resonance unit 100 while the resonance unit 100 emits the first electromagnetic wave EMW1, and stops providing the output current ITX to the resonance unit 100 to switch from reader mode to card mode when the magnitude of the antenna voltage VAN oscillates.

In reader mode, the magnitude of the antenna voltage VAN, which is generated by the resonance unit 100 while the resonance unit 100 emits the first electromagnetic wave EMW1, changes based on a movement of external NFC card or an external NFC reader.

Figure 2:
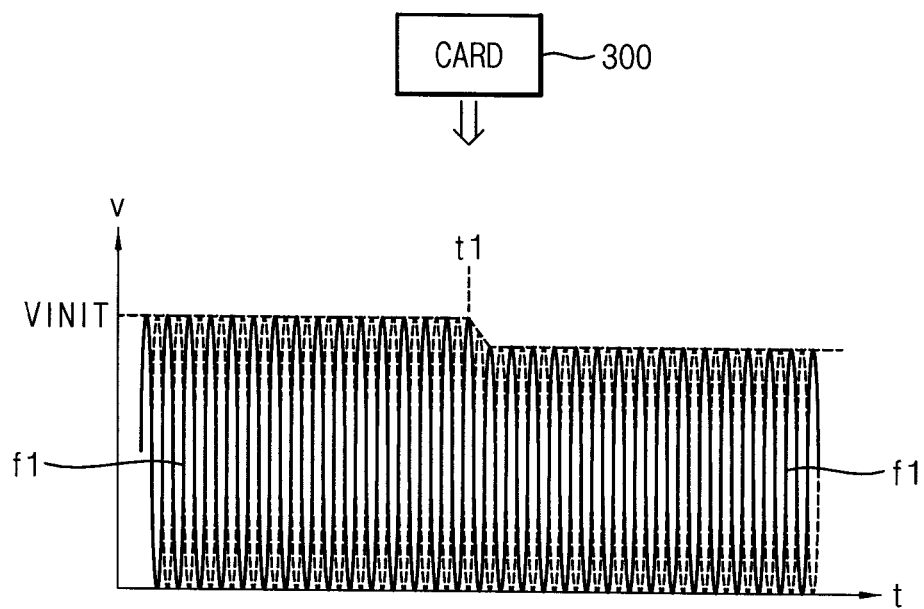
FIGS. 2, 3 and 4 are diagrams illustrating a change of an antenna voltage in the NFC device of FIG. 1.
Figure 3:
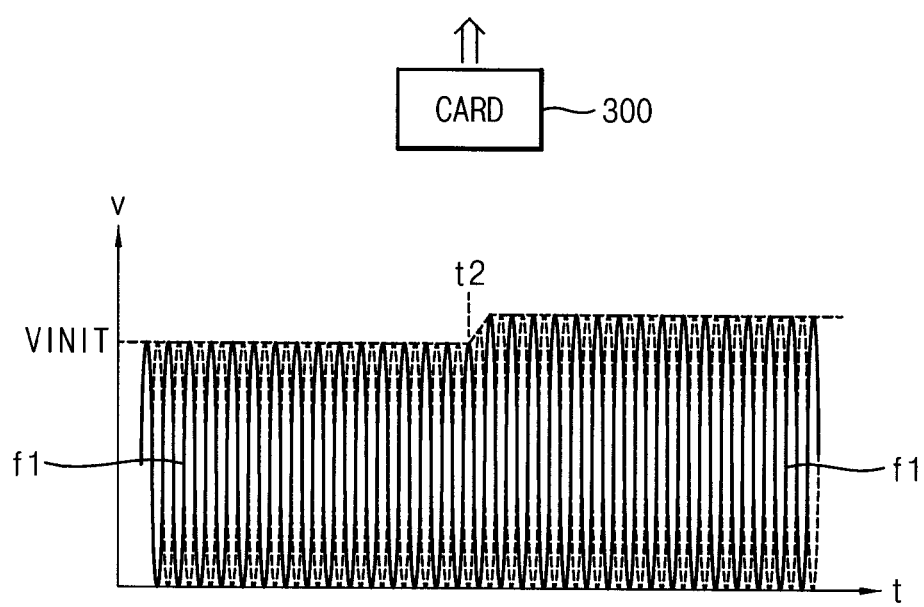
Figure 4:
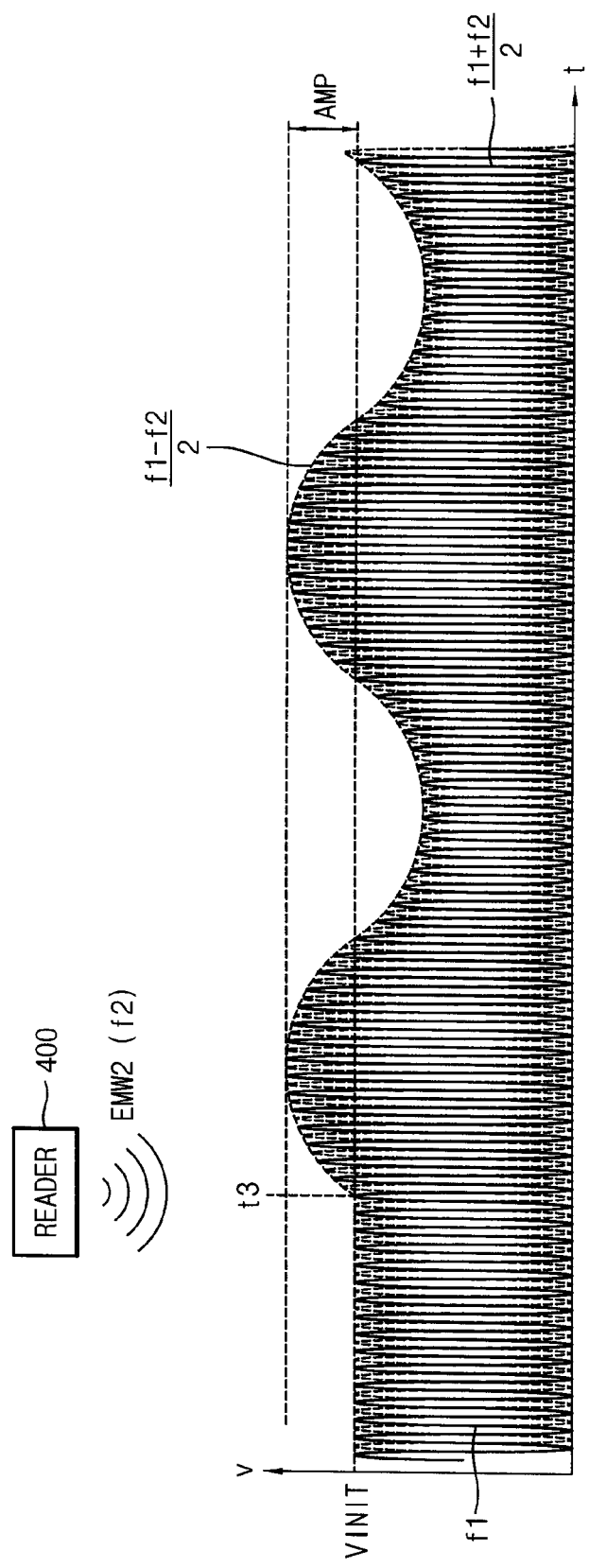

FIGS. 2, 3, and 4 are diagrams illustrating a change of magnitude of an antenna voltage VAN generated by a resonance unit 100 in the NFC device 10 of FIG. 1.

In FIGS. 2, 3, and 4, the x-axis represents time and the y-axis represents the antenna voltage VAN generated by the resonance unit 100.

The diagram of FIG. 2 illustrates a change of a magnitude of the antenna voltage VAN when an external NFC card 300 approaches the NFC device 10. The diagram of FIG. 3 represents a change of a magnitude of the antenna voltage VAN when an external NFC card 300 recedes from the NFC device 10. The diagram of FIG. 4 illustrates a change of a magnitude of the antenna voltage VAN when an external NFC reader 400 is in the vicinity of the NFC device 10.

Referring to FIG. 2, when the resonance unit 100 emits the first electromagnetic wave EMW1 of a first frequency f1 at an initial stage in reader mode, a frequency of the antenna voltage VAN is the first frequency f1, and the magnitude of the antenna voltage VAN is maintained at an initial voltage VINIT. When an external NFC card 300 approaches the NFC device 10 at a first time t1, a relatively strong mutual induction occurs between the resonance unit 100 and the external NFC card 300. Therefore, the magnitude of the antenna voltage VAN decreases from the initial voltage VINIT, while the frequency of the antenna voltage VAN is maintained at the first frequency f1.

Referring to FIG. 3, when the resonance unit 100 emits the first electromagnetic wave EMW1 of the first frequency f1 at the initial stage in reader mode, a frequency of the antenna voltage VAN is the first frequency f1, and the magnitude of the antenna voltage VAN is maintained at an initial voltage VINIT. When the external NFC card 300 recedes from the NFC device 10 at a second time t2, a relatively weak mutual induction occurs between the resonance unit 100 and the external NFC card 300. Therefore, the magnitude of the antenna voltage VAN increases from the initial voltage VINIT, while the frequency of the antenna voltage VAN is maintained at the first frequency f1.

Referring to FIG. 4, when the resonance unit 100 emits the first electromagnetic wave EMW1 of the first frequency f1 at the initial stage in reader mode, a frequency of the antenna voltage VAN is the first frequency f1, and the magnitude of the antenna voltage VAN is maintained at an initial voltage VINIT. When the external NFC reader 400 is within the vicinity of the NFC device 10 at a third time t3 such that the resonance unit 100 receives a second electromagnetic wave EMW2 of a second frequency f2 emitted from the external NFC reader 400 while the resonance unit 100 emits the first electromagnetic wave EMW1 of the first frequency f1, an interference occurs between the first electromagnetic wave EMW1 and the second electromagnetic wave EMW2.

According to NFC standards, NFC devices communicate with each other using an electromagnetic wave with a frequency of 13.56 MHz. However, the frequencies of electromagnetic waves emitted from the NFC device 10 and the external NFC reader 400 may not be exactly the same, because of differences between physical characteristics of the NFC device 10 and the external NFC reader 400. Therefore, the first frequency f1 of the first electromagnetic wave EMW1 emitted from the resonance unit 100 may be similar to but not exactly the same as a second frequency f2 of the second electromagnetic wave EMW2 emitted from the external NFC reader 400.

Since a beat phenomenon occurs when two electromagnetic waves of similar frequencies overlap, a beat phenomenon occurs in the antenna voltage VAN generated by the resonance unit 100 after the third time t3.

Generally, a combination electromagnetic wave generated from two overlapping electromagnetic waves may be represented by Equation (1).

$$x(t)=\sin(w1 t)$$

$$y(t)=\sin(w2 t)$$

$$z(t)=2*\sin((w1+w2)*t/2)*\cos((w1-w2)*t/2) \quad \text{Equation (1)}$$

In Equation (1), x(t) and y(t) represent two overlapping electromagnetic waves, and z(t) represents the combination electromagnetic wave.

Therefore, as illustrated in FIG. 4, after the third time t3, the frequency of the antenna voltage VAN corresponds to a mean of the first frequency f1 and the second frequency f2, and the magnitude of the antenna voltage VAN oscillates at a frequency corresponding to one half of a difference between the first frequency f1 and the second frequency f2. That is, the magnitude of the antenna voltage VAN oscillates after the third time t3.

The nearer the external NFC reader 400 is to the NFC device 10, the greater the amplitude AMP of an oscillation of the magnitude of the antenna voltage VAN. When the amplitude AMP of the oscillation of the magnitude of the antenna voltage VAN increases because of a field collision, errors may occur in the communication between the NFC device 10 and the external NFC card 400, and elements of the NFC device 10 may be damaged due to a high voltage of the antenna voltage VAN.

As described above, with reference to FIGS. 2 and 3, when the external NFC card 300 approaches or recedes from the NFC device 10, the magnitude of the antenna voltage VAN does not oscillate. However, as described above, with reference to FIG. 4, when an external NFC reader 400 is within the vicinity of the NFC device 10, the magnitude of the antenna voltage VAN oscillates.

As described above, the NFC chip 200 measures the antennal voltage VAN generated by the resonance unit 100 while the resonance unit 100 emits the first electromagnetic wave EMW1. When the magnitude of the antenna voltage VAN oscillates while the resonance unit 100 emits the first electromagnetic wave EMW1, the NFC chip 200 determines when the external NFC reader 400 is within the vicinity of the NFC device 10 and then controls the resonance unit 100 to stop emitting the first electromagnetic wave EMW1 to switch from reader mode to card mode.

Therefore, in reader mode, the NFC device 10, according to an embodiment of the present invention, differentiates a change of the magnitude of the antenna voltage VAN caused by the presence of an external NFC reader 400 from a change of the magnitude of the antenna voltage VAN caused by a movement of an external NFC card 300. When the NFC device 10 determines that an external NFC reader 400 is within the vicinity of the NFC device 10, the NFC device 10 stops emitting the first electromagnetic wave EMW1 and switches from reader mode to card mode. As such, the NFC device 10 effectively prevents elements of the NFC device 10 from being damaged by a high voltage of the antenna voltage VAN without degrading performance and stability of communication.

In card mode, a mutual induction occurs between the resonance unit 100 and an external NFC reader 400 due to an electromagnetic wave emitted from the external NFC reader 400, when the external NFC reader is in the vicinity of the NFC device 10. Therefore, the antenna voltage VAN is generated at the resonance circuit of the resonance unit 100 through the mutual induction with the external NFC reader 400. To receive input data in card mode, the resonance unit 100 provides the antenna voltage VAN to the NFC chip 200, and the NFC chip 200 demodulates the antenna voltage VAN to determine the input data. To transmit output data in card mode, the NFC chip 200 provides the resonance unit 100 with an impedance corresponding to a modulated signal, which is generated by modulating the output data, and the resonance unit 100 causes a mutual induction with an external NFC reader 400, based on an impedance determined from the electromagnetic wave EMW2 emitted from the external NFC reader 400.

Figure 5:
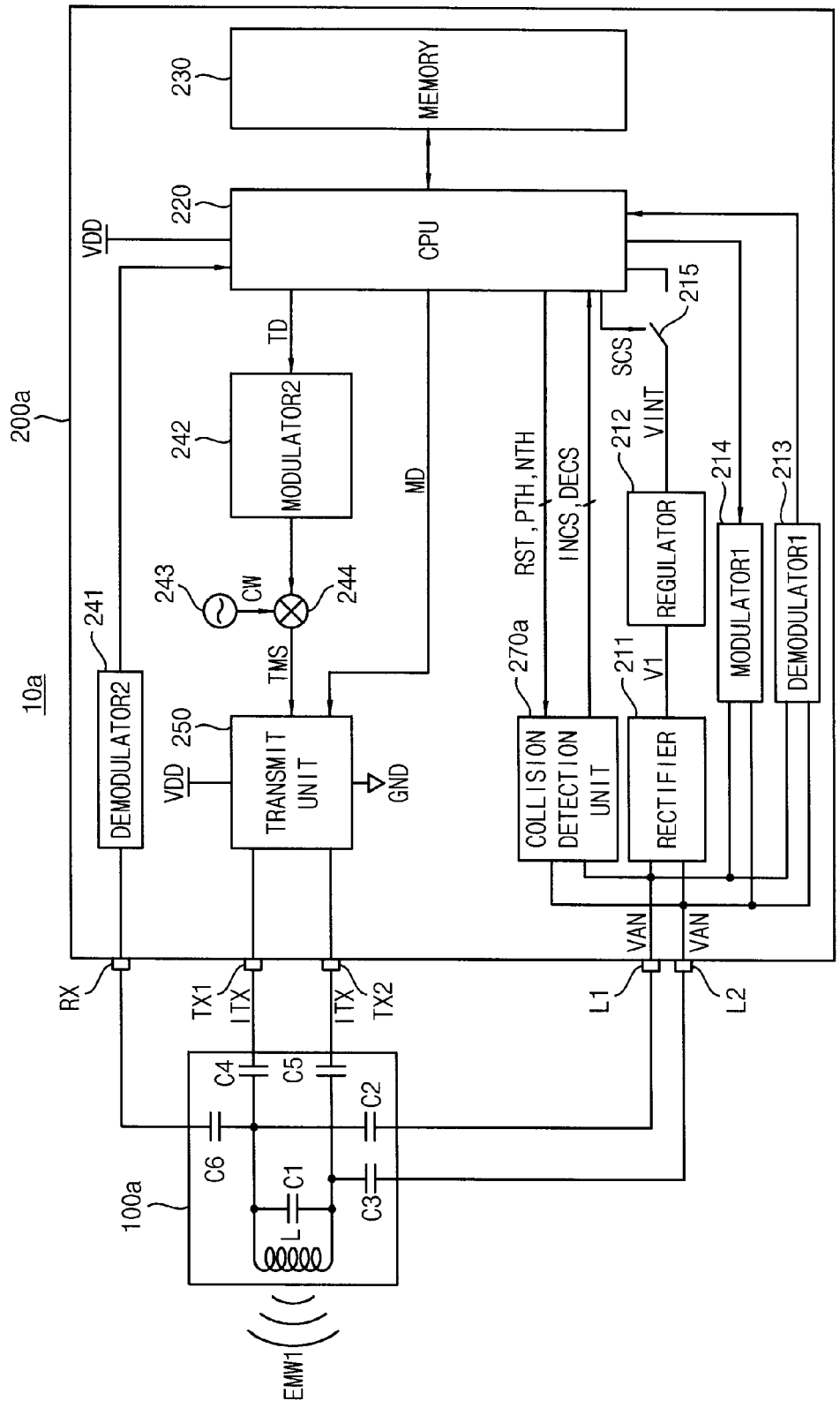
FIG. 5 is a block diagram of an embodiment of the NFC device according to the present invention.

FIG. 5 is a block diagram of an embodiment of an NFC device 10a of the present invention.

Referring to FIG. 5, an NFC device 10a includes a resonance unit 100a and an NFC chip 200a.

The NFC chip 200a is connected to the resonance unit 100a through a first power electrode L1, a second power electrode L2, a first transmission electrode TX1, a second transmission electrode TX2 and a reception electrode RX.

The resonance unit 100a includes a resonance circuit, which has an antenna represented by an inductance L and a first capacitance C1, a first filter, which has a second capacitor C2 and a third capacitor C3 connecting the resonance circuit to the first power electrode L1 and the second power electrode L2, respectively, a matching unit, which has a fourth capacitor C4 and a fifth capacitor C5 connecting the resonance circuit to the first transmission electrode TX1 and the second transmission electrode TX2, respectively, and performs an impedance matching, and a second filter, which has a sixth capacitor C6 connecting the resonance circuit to the reception electrode RX.

The resonance unit 100a in the present invention is not limited to the resonance unit 100a illustrated in FIG. 5.

The NFC chip 200a transmits and receives through the first power electrode L1 and the second power electrode L2 in card mode, transmits through the first transmission electrode TX1 and the second transmission electrode TX2 in reader mode, and receives through the reception electrode RX in reader mode.

The NFC chip 200a provides an output current ITX to the resonance unit 100a through the first transmission electrode TX1 and the second transmission electrode TX2, and receives the antenna voltage VAN from the resonance unit 100a through the first power electrode L1 and the second power electrode L2.

The NFC chip 200a includes a rectifier 211, a regulator 212, a first demodulator 213, a first modulator 214, a Central Processing Unit (CPU) 220, a power switch 215, a memory 230, a second demodulator 241, a second modulator 242, an oscillator 243, a mixer 244, a transmit unit 250, and a collision detection unit 270a.

The rectifier 211 generates a first voltage V1, which is a Direct Current (DC) voltage, by rectifying the antenna voltage VAN provided by the resonance unit 100a through the first power electrode L1 and the second power electrode L2.

The regulator 212 generates an internal voltage VINT, which has a voltage level of a predetermined magnitude usable in the NFC chip 200a, using the first voltage V1.

The CPU 220 controls the overall operation of the NFC chip 200a. The CPU 220 operates using a supply voltage VDD provided by a power source, such as a battery. In addition, the CPU 220 receives the internal voltage VINT from the regulator 212 through the power switch 215. When the supply voltage VDD is greater than or equal to a predetermined voltage level, the CPU 220 operates using the supply voltage VDD and disables a switch control signal SCS to turn off (i.e., open) the power switch 215 so that VINT is not provided to the CPU 220. When the supply voltage VDD is less than the predetermined voltage level, the CPU 220 enables the switch control signal SCS to turn on (i.e., close) the power switch 215 such that the CPU 220, is provided with and, operates using the internal voltage VINT provided by the regulator 212.

When the NEC chip 200a receives input data in card mode, the first demodulator 213 recovers the input data by demodulating a signal provided by the resonance unit 100a through the first power electrode L1 and the second power electrode L2 and provides the input data to the CPU 220. The CPU 220 stores the input data in the memory 230.

When the NFC chip 200a transmits output data in card mode, the CPU 220 reads the output data from the memory 230 and provides the output data to the first modulator 214, and the first modulator 214 modulates the output data and provides a modulation signal to the first power electrode L1 and the second power electrode L2. For example, the first modulator 214 generates the modulation signal by performing a load modulation on the output data.

When the NFC chip 200a receives input data in reader mode, the second demodulator 241 recovers the input data by demodulating a signal provided by the resonance unit 100a through the reception electrode RX and provides the input data to the CPU 220. The CPU 220 stores the input data in the memory 230.

When the NFC chip 200a transmits output data in reader mode, the CPU 220 reads the output data TD from the memory 230 and provides the output data TD to the second modulator 242, the second modulator 242 modulates the output data TD to generate a modulation signal, the oscillator 243 generates a carrier signal CW having a carrier frequency (e.g., about 13.56 MHz), and the mixer 244 generates a transmission modulation signal TMS by synthesizing the carrier signal CW with the modulation signal.

The transmit unit 250 is coupled between the supply voltage VDD and a ground voltage GND.

The CPU 220 provides a mode signal MD, which indicates either card mode or reader mode, to the transmit unit 250, and the transmit unit 250 operates in card mode or in reader mode based on the mode signal MD.

In reader mode, the transmit unit 250 provides the output current ITX, which corresponds to the transmission modulation signal TMS received from the mixer 244, to the resonance unit 100a through the first transmission electrode TX1 and the second transmission electrode TX2, and the resonance unit 100a emits the first electromagnetic wave EMW1 having a magnitude corresponding to the output current ITX.

In an embodiment of the present invention, in reader mode, the transmit unit 250 provides the output current ITX corresponding to the transmission modulation signal TMS to the resonance unit 100a through the first transmission electrode TX1 and the second transmission electrode TX2 by connecting the first transmission electrode TX1 and the second transmission electrode TX2 to the supply voltage VDD through a pull-up load or to the ground voltage GND through a pull-down load based on the transmission modulation signal TMS.

For example, in reader mode, the transmit unit 250 connects the first transmission electrode TX1 to the supply voltage VDD through a pull-up load and connects the second transmission electrode TX2 to the ground voltage GND through a pull-down load, or connects the first transmission electrode TX1 to the ground voltage GND through the pull-down load and connects the second transmission electrode TX2 to the supply voltage VDD through the pull-up load, based on the transmission modulation signal TMS to provide the output current ITX corresponding to the transmission modulation signal TMS to the resonance unit 100a through the first transmission electrode TX1 and the second transmission electrode TX2. When the transmit unit 250 connects the first transmission electrode TX1 to the supply voltage VDD through the pull-up load and connects the second transmission electrode TX2 to the ground voltage GND through the pull-down load, the output current ITX is generated from the supply voltage VDD, is provided to the resonance unit 100a through the first transmission electrode TX1, and is sunk to the ground voltage GND through the second transmission electrode TX2. When the transmit unit 250 connects the first transmission electrode TX1 to the ground voltage GND through the pull-down load and connects the second transmission electrode TX2 to the supply voltage VDD through the pull-up load, the output current ITX is generated from the supply voltage VDD, is provided to the resonance unit 100a through the second transmission electrode TX2, and is sunk to the ground voltage GND through the first transmission electrode TX1.

In card mode, the first transmission electrode TX1 and the second transmission electrode TX2 are disconnected from the supply voltage VDD and the ground voltage GND. As a result, the transmit unit 250 does not provide the output current ITX to the resonance unit 100a.

The collision detection unit 270a is coupled to the resonance unit 100a through the first power electrode L1 and the second power electrode L2. The collision detection unit 270a activates an increase signal INCS and a decrease signal DECS based on the magnitude of the antenna voltage VAN received from the resonance unit 100a through the first power electrode L1 and the second power electrode L2. The increase signal INCS and the decrease signal DECS generated by the collision detection unit 270a are provided to the CPU 220.

In an embodiment of the present invention, the collision detection unit 270a measures the magnitude of the antenna voltage VAN received from the resonance unit 100a at an initial stage of reader mode, and stores the measured magnitude as a reference value. Then, the collision detection unit 270a periodically measures the magnitude of the antenna voltage VAN received from the resonance unit 100a in response to a reset signal RST periodically provided by the CPU 220. When the measured magnitude is greater than the reference value by at least a positive threshold value PTH, the collision detection unit 270a activates the increase signal INCS. When the measured magnitude is less than the reference value by at least a negative threshold value NTH, the collision detection unit 270a activates the decrease signal DECS.

In an embodiment of the present invention, the collision detection unit 270a receives the positive threshold value PTH and the negative threshold value NTH from the CPU 220.

In an embodiment of the present invention, the collision detection unit 270a stores the positive threshold value PTH and the negative threshold value NTH internally.

In reader mode, the CPU 200 switches an operation mode of the NFC chip 200a from reader mode to card mode based on the increase signal INCS and the decrease signal DECS received from the collision detection unit 270a, and provides the mode signal MD having a logic level corresponding to card mode to the transmit unit 250. For example, when the increase signal INCS and the decrease signal DECS provided by the collision detection unit 270a are activated alternately while the NFC device 10a is in reader mode, the CPU 220 determines that the external NFC reader 400 is sufficiently within the vicinity of the NFC device 10a to cause a field collision, switches the operation mode from reader mode to card mode, and provides the mode signal MD having a logic level corresponding to card mode to the transmit unit 250.

As described above, when the transmit unit 250 receives the mode signal MD having a logic level corresponding to card mode from the CPU 220, the transmit unit 250 stops providing the output current ITX to the resonance unit 100a, such that the resonance unit 100a stops emitting the first electromagnetic wave EMW1.

Therefore, when the external NFC reader 400 is in the vicinity of the NFC device 10a while the NFC device 10a initially operates in reader mode, the NFC device 10a effectively prevents an increase of the antenna voltage VAN, which is caused by an interference between the first electromagnetic wave EMW1 emitted by the resonance unit 100a and the second electromagnetic wave EMW2 emitted by the external NFC reader 400, by switching to card mode and stopping the emission of the first electromagnetic wave EMW1. As such, the NFC device 10a effectively prevents the elements included in the NFC device 10a from being damaged by a high voltage of the antenna voltage VAN.

Figure 6:
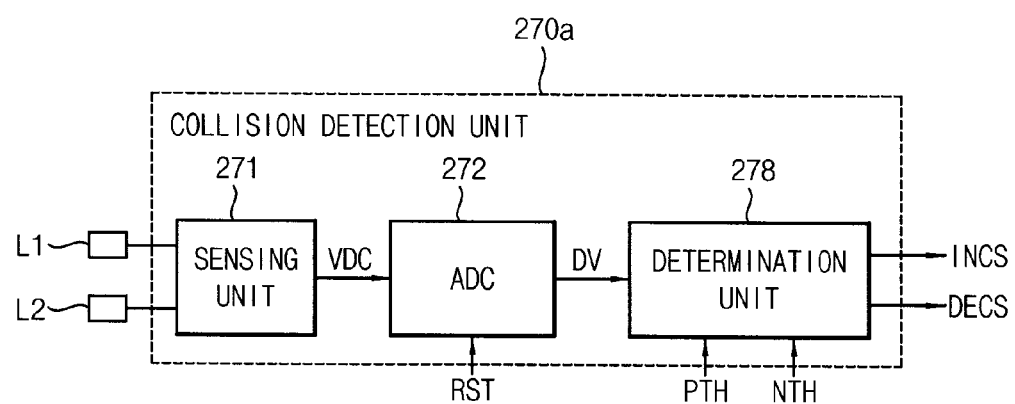
FIG. 6 is a block diagram of the collision detection unit of the NFC device of FIG. 5.

FIG. 6 is a block diagram of an embodiment of the collision detection unit 270a of the NFC device 10a of FIG. 5.

Referring to FIG. 6, the collision detection unit 270a includes a sensing unit 271, an Analog-to-Digital Conversion unit (ADC) 272, and a determination unit 278.

The sensing unit 271 generates a DC voltage VDC based on the antenna voltage VAN received from the resonance unit 100a through the first power electrode L1 and the second power electrode L2. For example, the sensing unit 271 generates a DC voltage VDC that is proportional to the magnitude of the antenna voltage VAN.

Figure 7:
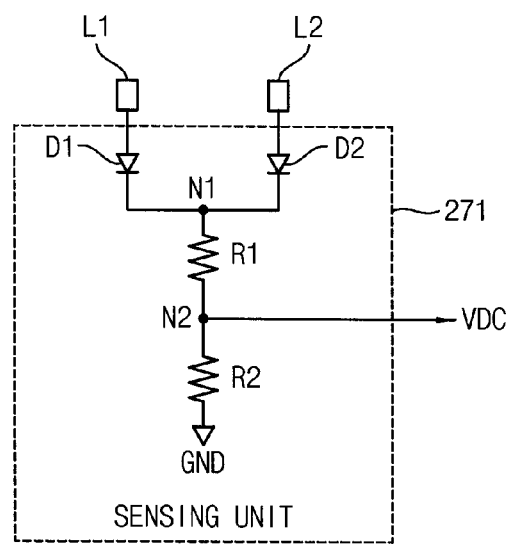
FIG. 7 is a block diagram of an embodiment of a sensing unit of FIG. 6.

FIG. 7 is a block diagram of an embodiment of a sensing unit 271 of FIG. 6.

Referring to FIG. 7, the sensing unit 271 may include a rectification circuit having a first diode D1, a second diode D2, a first resistor R1, and a second resistor R2.

The first diode D1 is coupled between the first power electrode L1 and a first node N1, and the second diode D2 is coupled between the second power electrode L2 and the first node N1. As a result, the rectification circuit of the sensing unit 271 rectifies the antenna voltage VAN received through the first power electrode L1 and the second power electrode L2 to generate a rectified voltage.

The first resistor R1 is coupled between the first node N1 and a second node N2, and the second resistor R2 is coupled between the second node N2 and the ground voltage GND.

Since the first resistor R1 and the second resistor R2 operate as a voltage divider that divides the rectified voltage, the sensing unit 271 converts the antenna voltage VAN to a Direct Current (DC) voltage VDC, and outputs the DC voltage VDC through the second node N2.

Figure 8:
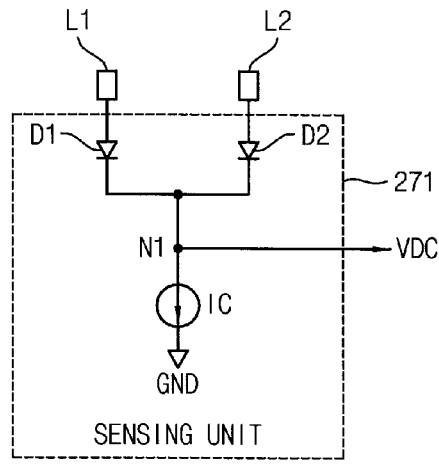
FIG. 8 is a block diagram of an embodiment of a sensing unit of FIG. 6.

FIG. 8 is a block diagram of an embodiment of the sensing unit 271 of FIG. 6.

Referring to FIG. 8, the sensing unit 271 includes a rectification circuit having a first diode D1, a second diode D2, and a current source IC.

The first diode D1 is coupled between the first power electrode L1 and a first node N1, and the second diode D2 is coupled between the second power electrode L2 and the first node N1. As a result, the rectification circuit of the sensing unit 271 rectifies the antenna voltage VAN received through the first power electrode L1 and the second power electrode L2 to generate a rectified voltage.

The current source IC is coupled between the first node N1 and the ground voltage GND. The current source IC generates a current having a constant magnitude.

Since a magnitude of the rectified voltage is varied according to a magnitude of the current generated by the current source IC, the sensing unit 271 converts the antenna voltage VAN to the DC voltage VDC, and outputs the DC voltage VDC through the first node N1.

Referring to FIG. 6, the analog-to-digital conversion unit 272 periodically generates a digital value DV by performing an analog-to-digital conversion on the DC voltage VDC periodically, in response to the reset signal RST periodically provided by the CPU 220.

Figure 9:
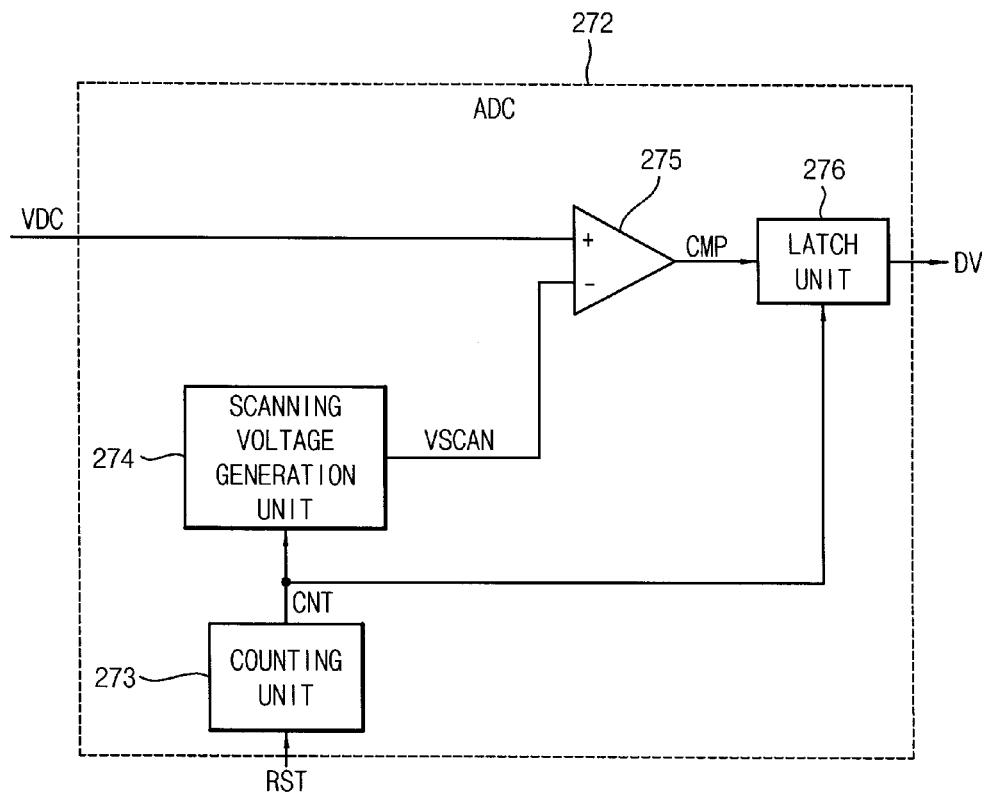
FIG. 9 is a block diagram of an analog-to-digital conversion unit of FIG. 6.

FIG. 9 is a block diagram of the analog-to-digital conversion unit 272 of FIG. 6.

Referring to FIG. 9, the analog-to-digital conversion unit 272 includes a counting unit 273, a scanning voltage generation unit 274, a comparator 275 and a latch unit 276.

The counting unit 273 generates a counting value CNT by performing, for example, an increment operation, and resets the counting value CNT, in response to the reset signal RST provided by the CPU 220.

The scanning voltage generation unit 274 generates a scanning voltage VSCAN sequentially increasing, based on the counting value CNT.

Figure 10:
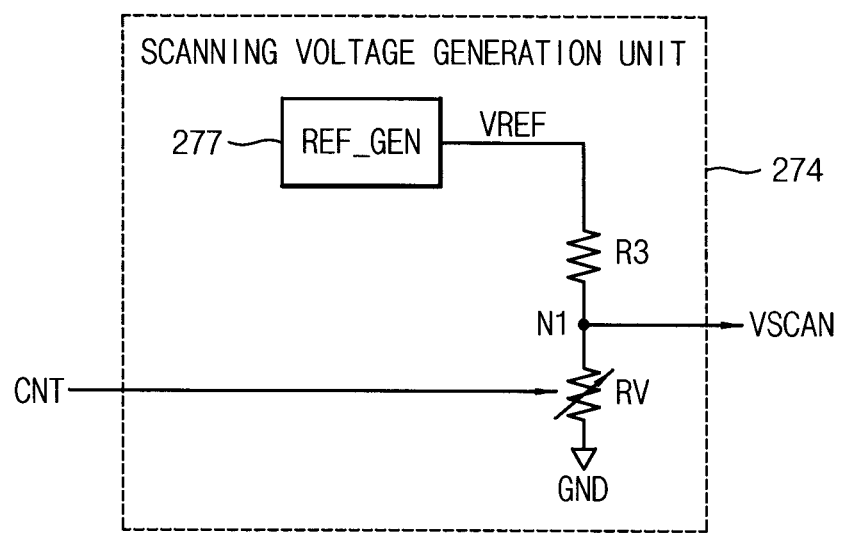
FIG. 10 is a block diagram of a scanning voltage generation unit of FIG. 9.

FIG. 10 is a block diagram of a scanning voltage generation unit 274 of FIG. 9.

Referring to FIG. 10, the scanning voltage generation unit 274 includes a reference voltage generator REF_GEN 277, a third resistor R3, and a variable resistor RV.

The reference voltage generator 277 generates a reference voltage VREF having a predetermined voltage level.

The third resistor R3 is coupled between the reference voltage generator 277 and a first node N1, and the variable resistor RV is coupled between the first node N1 and the ground voltage GND. The variable resistor RV has a resistance corresponding to the counting value CNT.

Since the third resistor R3 and the variable resistor RV operate as a voltage divider, the scanning voltage generation unit 274 generates the scanning voltage VSCAN proportional to the counting value CNT, and outputs the scanning voltage VSCAN through the first node N1.

In addition, the scanning voltage generation unit 274 controls the precision of the collision detection unit 270a for converting the antenna voltage VAN to the digital value DV, by adjusting an increase rate of a resistance of the variable resistor RV, with reference to the counting value CNT.

Referring to FIG. 9, the comparator 275 outputs a comparison signal CMP having a first logic level when the DC voltage VDC is greater than the scanning voltage VSCAN, and having a second logic level when the DC voltage VDC is less than or equal to the scanning voltage VSCAN. That is, the comparator 275 outputs the comparison signal CMP having a first logic level in response to the DC voltage VDC being greater than the scanning voltage VSCAN, and outputs the comparison signal CMP having a second logic level in response to the DC voltage VDC being less than or equal to the scanning voltage VSCAN.

Since the scanning voltage VSCAN increases sequentially based on the counting value CNT, the comparator 275 initially outputs the comparison signal CMP having the first logic level, and transitions the comparison signal CMP to the second logic level when the scanning voltage VSCAN is greater than the DC voltage VDC. That is, the comparator 275 transitions the comparison signal CMP to the second logic level when the scanning voltage VSCAN is greater than the DC voltage VDC.

The latch unit 276 latches the counting value CNT in response to a transition of the comparison signal CMP, and outputs the latched value as the digital value DV.

The analog-to-digital conversion unit 272 described above with reference to FIGS. 9 and 10 is not limited thereto. The analog-to-digital conversion unit 272 may be implemented in various embodiments for performing analog-to-digital conversion.

Referring to FIG. 6, the determination unit 278 stores the digital value DV received from the analog-to-digital conversion unit 272 at the initial stage in reader mode as the reference value. Then, the determination unit 278 activates the increase signal INCS when the digital value DV, which is periodically provided from the analog-to-digital conversion unit 272, is greater than the reference value by at least the positive threshold value PTH, and activates the decrease signal DECS when the digital value DV, which is periodically provided from the analog-to-digital conversion unit 272, is less than the reference value by at least the negative threshold value NTH.

In an embodiment of the present invention, the determination unit 278 receives the positive threshold value PTH and the negative threshold value NTH from the CPU 220.

In an embodiment of the present invention, the determination unit 278 stores the positive threshold value PTH and the negative threshold value NTH internally.

Figure 11:
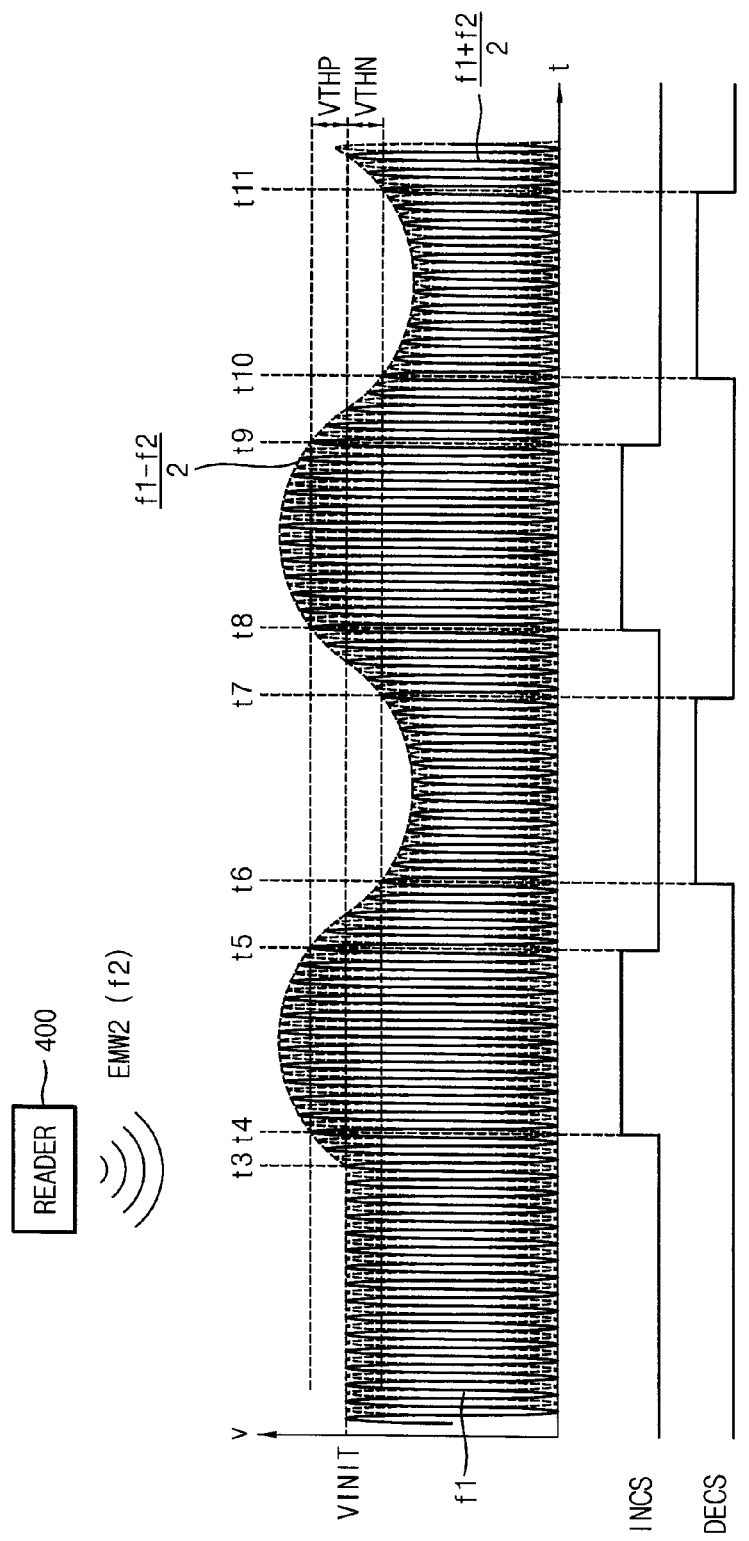
FIG. 11 is a diagram illustrating the operation of the collision detection unit of FIG. 6.

FIG. 11 is a diagram illustrating an operation of a collision detection unit 270a of FIG. 6.

In FIG. 11, the x-axis represents time and the y-axis represents the antenna voltage VAN generated by the resonance unit 100a.

Referring to FIG. 11, when the resonance unit 100a emits the first electromagnetic wave EMW1 of the first frequency f1 at the initial stage in reader mode, a frequency of the antenna voltage VAN is the first frequency f1 and the magnitude of the antenna voltage VAN is maintained at an initial voltage VINIT. Therefore, at the initial stage in reader mode, the digital value DV, which is periodically provided from the analog-to-digital conversion unit 272, is maintained at a constant value, and the determination unit 278 stores the digital value DV maintained at the constant value at the initial stage in reader mode as the reference value. As such, the reference value corresponds to the initial voltage VINIT.

Then, as described above with reference to FIG. 4, when an external NFC reader 400 is in the vicinity of the NFC device 10a at the third time t3 such that the resonance unit 100a receives the second electromagnetic wave EMW2 of the second frequency f2 emitted from the external NFC reader 400 while the resonance unit 100a emits the first electromagnetic wave EMW1 of the first frequency f1, an interference occurs between the first electromagnetic wave EMW1 and the second electromagnetic wave EMW2 such that the magnitude of the antenna voltage VAN oscillates after the third time t3.

As illustrated in FIG. 11, when the magnitude of the antenna voltage VAN is greater than the initial voltage VINIT by a positive threshold voltage VTHP, which corresponds to the positive threshold value PTH, at a fourth time t4, the determination unit 278 activates the increase signal INCS.

Then, when a difference between the magnitude of the antenna voltage VAN and the initial voltage VINIT is less than the positive threshold voltage VTHP at a fifth time t5, the determination unit 278 deactivates the increase signal INCS.

When the magnitude of the antenna voltage VAN is less than the initial voltage VINIT by a negative threshold voltage VTHN, which corresponds to the negative threshold value NTH, at a sixth time t6, the determination unit 278 activates the decrease signal DECS.

Then, when a difference between the initial voltage VINIT and the magnitude of the antenna voltage VAN is less than a magnitude of the negative threshold voltage VTHN at a seventh time t7, the determination unit 278 deactivates the decrease signal DECS.

Similarly, as illustrated in FIG. 11, the increase signal INCS is activated between an eighth time t8 and a ninth time t9, and the decrease signal DECS is activated between a tenth time t10 and an eleventh time t11.

As described above with reference to FIGS. 6 to 11, when the external NFC reader 400 is in the vicinity of the NFC device 10a such that the resonance unit 100a receives the second electromagnetic wave EMW2 of the second frequency f2 emitted from the external NFC reader 400 while the resonance unit 100a emits the first electromagnetic wave EMW1 of the first frequency f1, an interference occurs between the first electromagnetic wave EMW1 and the second electromagnetic wave EMW2 such that the magnitude of the antenna voltage VAN oscillates. Therefore, when the external NFC reader 400 is in the vicinity of the NFC device 10a while in reader mode, the collision detection unit 270a activates the increase signal INCS and the decrease signal DECS alternately.

When the increase signal INCS and the decrease signal DECS provided by the collision detection unit 270a are activated alternately while in reader mode, the CPU 220 determines that the external NFC reader 400 is sufficiently within the vicinity of the NFC device 10a to cause a field collision, switches the operation mode of the NFC device 10a from reader mode to card mode, and provides the mode signal MD having a logic level corresponding to card mode to the transmit unit 250.

When the transmit unit 250 receives the mode signal MD having a logic level corresponding to card mode from the CPU 220, the transmit unit 250 stops providing the output current ITX to the resonance unit 100a. Therefore, the resonance unit 100a stops emitting the first electromagnetic wave EMW1.

Figure 12:
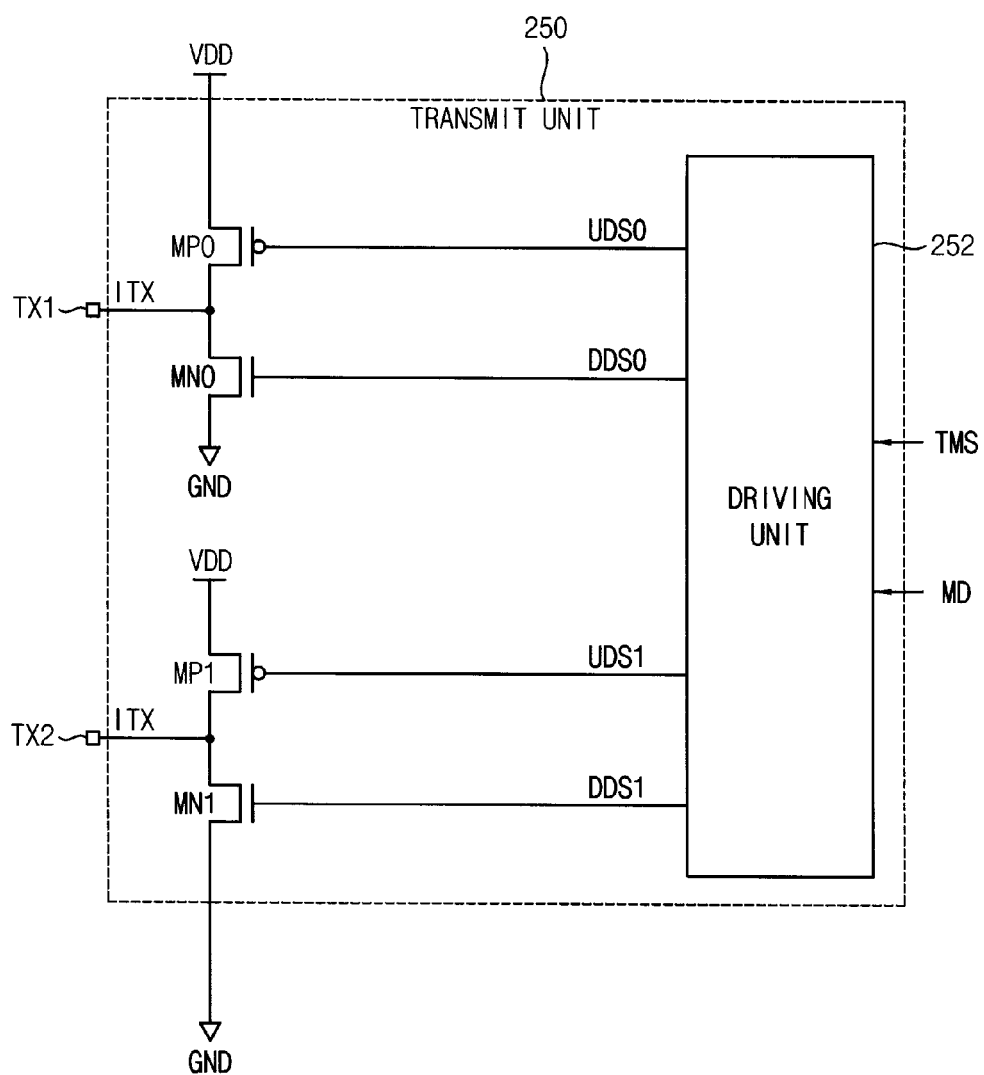
FIG. 12 is a block diagram of the transmit unit of FIG. 5.

FIG. 12 is a block diagram of a transmit unit 250 of FIG. 5.

Referring to FIG. 12, the transmit unit 250 includes a first pull-up transistor MP0, a second pull-up transistor MP1, a first pull-down transistor MN0, a second pull-down transistor MN1, and a driving unit 252.

The first pull-up transistor MP0 and the second pull-up transistor MP1 may be, for example, P-type Metal Oxide Semiconductor (PMOS) transistors. The first pull-down transistor MN0 and the second pull-down transistor MN1 may be, for example, N-type Metal Oxide Semiconductor (NMOS) transistors.

The first pull-up transistor MP0 is coupled between a supply voltage VDD and the first transmission electrode TX1, and the first pull-down transistor MN0 is coupled between the first transmission electrode TX1 and a ground voltage GND.

The second pull-up transistor MP1 is coupled between the supply voltage VDD and the second transmission electrode TX2, and the second pull-down transistor MN1 may be coupled between the second transmission electrode TX2 and the ground voltage GND.

The driving unit 252 drives (i.e., turns on or turns off) the first pull-up transistor MP0 using a first pull-up driving signal UDS0, drives the first pull-down transistor MN0 using a first pull-down driving signal DDS0, drives the second pull-up transistor MP1 using a second pull-up driving signal UDS1, and drives the second pull-down transistor MN1 using a second pull-down driving signal DDS1.

The driving unit 252 operates in card mode or in reader mode, based on the mode signal MD provided by the CPU 220.

In reader mode, the driving unit 252 turns on one of the first pull-up transistor MP0 and the first pull-down transistor MN0 and turns on one of the second pull-up transistor MP1 and the second pull-down transistor MN1, based on the transmission modulation signal TMS.

For example, in reader mode, the driving unit 252 turns on the first pull-up transistor MP0 and the second pull-down transistor MN1 and turns off the second pull-up transistor MP1 and the first pull-down transistor MN0, or turns on the second pull-up transistor MP1 and the first pull-down transistor MN0 and turns off the first pull-up transistor MP0 and the second pull-down transistor MN1, based on the transmission modulation signal TMS.

When the driving unit 252 turns on the first pull-up transistor MP0 and the second pull-down transistor MN1 and turns off the second pull-up transistor MP1 and the first pull-down transistor MN0, the output current ITX is generated from the supply voltage VDD, provided to the resonance unit 100a through the first pull-up transistor MP0 and the first transmission electrode TX1, and sunk to the ground voltage GND through the second transmission electrode TX2 and the second pull-down transistor MN1. In contrast, when the driving unit 252 turns on the second pull-up transistor MP1 and the first pull-down transistor MN0 and turns off the first pull-up transistor MP0 and the second pull-down transistor MN1, the output current ITX is generated from the supply voltage VDD, provided to the resonance unit 100a through the second pull-up transistor MP1 and the second transmission electrode TX2, and sunk to the ground voltage GND through the first transmission electrode TX1 and the first pull-down transistor MN0.

In card mode, the driving unit 252 turns off the first pull-up transistor MP0, the first pull-down transistor MN0, the second pull-up transistor MP1 and the second pull-down transistor MN1. As a result, the transmit unit 250 provides the output current ITX to the resonance unit 100a in card mode. Since the resonance unit 100a does not receive the output current ITX from the transmit unit 250, the resonance unit 100a stops emitting the first electromagnetic wave EMW1.

As described above, when the magnitude of the antenna voltage VAN, which is generated by the resonance unit 100a while the resonance unit 100a emits the first electromagnetic wave EMW1, in reader mode, which oscillates, the NFC device 10a determines that the external NFC reader 400 is in the vicinity of the NFC device 10a, stops emitting the first electromagnetic wave EMW1, and switches the operation mode from reader mode to card mode. Therefore, the NFC device 10a is able to differentiate a change of the magnitude of the antenna voltage VAN caused by an external NFC reader 400 being in the vicinity of the NFC device 10a from a change of the magnitude of the antenna voltage VAN caused by a movement of an external NFC card 300 while in reader mode. When the NFC device 10a determines that the external NFC reader 400 is in the vicinity of the NFC device 10a, the NFC device 10a stops emitting the first electromagnetic wave EMW1 and switches the operation mode from reader mode to card mode. Therefore, the NFC device 10a effectively prevents an increase of the antenna voltage VAN, which is caused by an interference between the first electromagnetic wave EMW1 emitted by the NFC device 10a and the second electromagnetic wave EMW2 emitted by the external NFC reader 400, by stopping the emission of the first electromagnetic wave EMW1. As such, the NFC device 10a effectively prevents the NFC device 10a from being damaged by a high voltage of the antenna voltage VAN without degrading performance and stability of the NFC device 10a.

Figure 13:
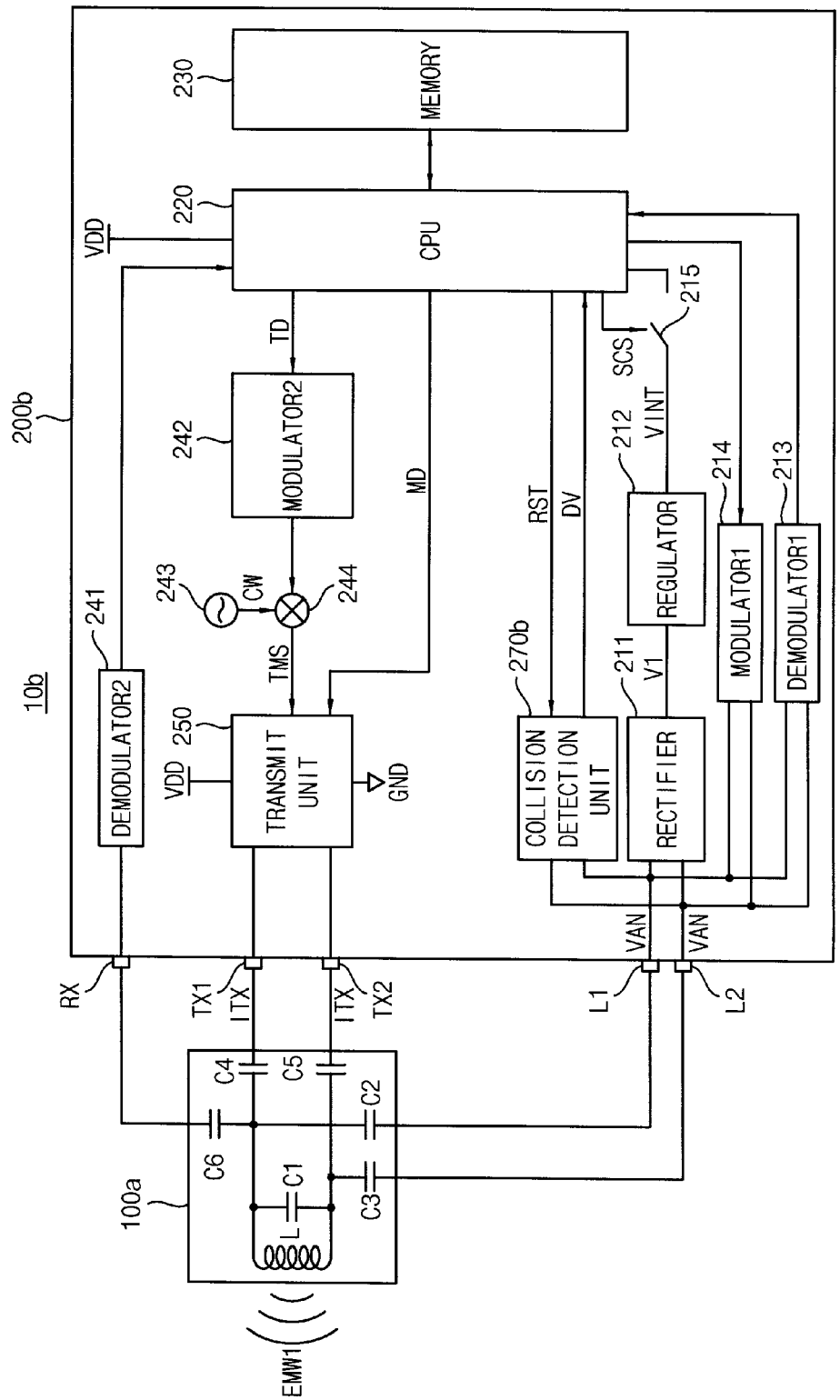
FIG. 13 is a block diagram of an embodiment of an NFC device according to the present invention.

FIG. 13 is a block diagram illustrating an embodiment of an NFC device 10b.

Referring to FIG. 13, an NFC device 10b includes a resonance unit 100a and an NFC integrated circuit, or chip, 200b.

The resonance unit 100a included in the NFC device 10b of FIG. 13 is the same as the resonance unit 100a in the NFC device 10a of FIG. 5. The NFC chip 200b in the NFC device 10b of FIG. 13 is the same as the NFC chip 200a in the NFC device 10a of FIG. 5 except that the NFC chip 200b includes a collision detection unit 270b instead of the collision detection unit 270a.

The collision detection unit 270b is coupled to the resonance unit 100a through a first power electrode L1 and a second power electrode L2. The collision detection unit 270b periodically measures the magnitude of the antenna voltage VAN received from the resonance unit 100a through the first power electrode L1 and the second power electrode L2 based on a reset signal RST periodically provided by the CPU 220 to generate a digital value DV periodically. The digital value DV generated by the collision detection unit 270b is provided to the CPU 220.

Figure 14:
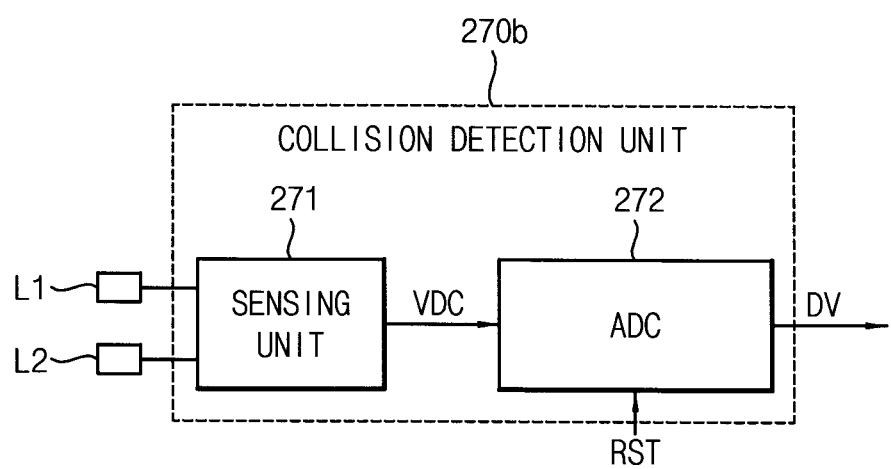
FIG. 14 is a block diagram of the collision detection unit of FIG. 13.

FIG. 14 is a block diagram of the collision detection unit 270b in the NFC device 10b of FIG. 13.

Referring to FIG. 14, the collision detection unit 270b includes a sensing unit 271 and an Analog-to-Digital Conversion unit (ADC) 272.

The sensing unit 271 generates a DC voltage VDC based on the antenna voltage VAN received from the resonance unit 100a through the first power electrode L1 and the second power electrode L2. For example, the sensing unit 271 generates the DC voltage VDC proportional to the magnitude of the antenna voltage VAN.

The analog-to-digital conversion unit 272 periodically generates the digital value DV by performing an analog-to-digital conversion on the DC voltage VDC periodically in response to the reset signal RST periodically provided by the CPU 220.

The sensing unit 271 and the analog-to-digital conversion unit 272 included in the collision detection unit 270b of FIG. 14 are the same as the sensing unit 271 and the analog-to-digital conversion unit 272 included in the collision detection unit 270a of FIG. 6. A structure and an operation of the sensing unit 271 and the analog-to-digital conversion unit 272 included in the collision detection unit 270a of FIG. 6 is described above with reference to FIGS. 6 to 10. Therefore, a detail description of the sensing unit 271 and the analog-to-digital conversion unit 272 included in the collision detection unit 270b of FIG. 14 is omitted.

Referring to FIG. 13, in reader mode, the CPU 220 switches an operation mode of the NFC chip 200b from reader mode to card mode based on the digital value DV received from the collision detection unit 270b, and provides the mode signal MD having a logic level corresponding to card mode to the transmit unit 250.

In an embodiment of the present invention, the CPU 220 stores the digital value DV received from the collision detection unit 270b at an initial stage of reader mode as a reference value. Then, the CPU 220 determines whether the digital value DV, which is periodically provided by the collision detection unit 270b, oscillates. For example, when the digital value DV, which is periodically provided by the collision detection unit 270b, is greater than the reference value by at least a positive threshold value then is less than the reference value by at least a negative threshold value alternately, the CPU 220 determines that the external NFC reader 400 is sufficiently within the vicinity of the NFC device 10a to cause a field collision, switches the operation mode from reader mode to card mode, and provides the mode signal MD having a logic level corresponding to card mode to the transmit unit 250.

In an embodiment of the present invention, the CPU 220 stores the positive threshold value and the negative threshold value internally.

In an embodiment of the present invention, the CPU 220 receives the positive threshold value and the negative threshold value from an external source.

When the transmit unit 250 receives the mode signal MD having a logic level corresponding to card mode from the CPU 220, the transmit unit 250 stops providing the output current ITX to the resonance unit 100a. Since the resonance unit 100a does not receive the output current ITX from the transmit unit 250, the resonance unit 100a stops emitting the first electromagnetic wave EMW1.

As described above, when the magnitude of the antenna voltage VAN, which is generated by the resonance unit 100a while the resonance unit 100a emits the first electromagnetic wave EMW1 in reader mode, oscillates, the NFC device 10b determines that the external NFC reader 400 is in the vicinity of the NFC device 10b, stops emitting the first electromagnetic wave EMW1, and switches the operation mode from reader mode to card mode. Therefore, the NFC device 10b is able to differentiate a change of the magnitude of the antenna voltage VAN caused by an external NFC reader 400 in the vicinity of the NFC device 10b from a change of the magnitude of the antenna voltage VAN caused by a movement of the external NFC card 300 while in reader mode. When the NFC device 10b determines that the external NFC reader 400 is in the vicinity of the NFC device 10b, the NFC device 10b stops emitting the first electromagnetic wave EMW1 and switches the operation mode from reader mode to card mode. Therefore, the NFC device 10b effectively prevents an increase of the antenna voltage VAN, which may be caused by an interference between the first electromagnetic wave EMW1 emitted by the NFC device 10b and the second electromagnetic wave EMW2 emitted by the external NFC reader 400, by stopping the emission of the first electromagnetic wave EMW1. As such, the NFC device 10b effectively prevents the elements in the NFC device 10b from being damaged by a high voltage of the antenna voltage VAN without degrading performance and stability of the NFC device 10b.

Figure 15:
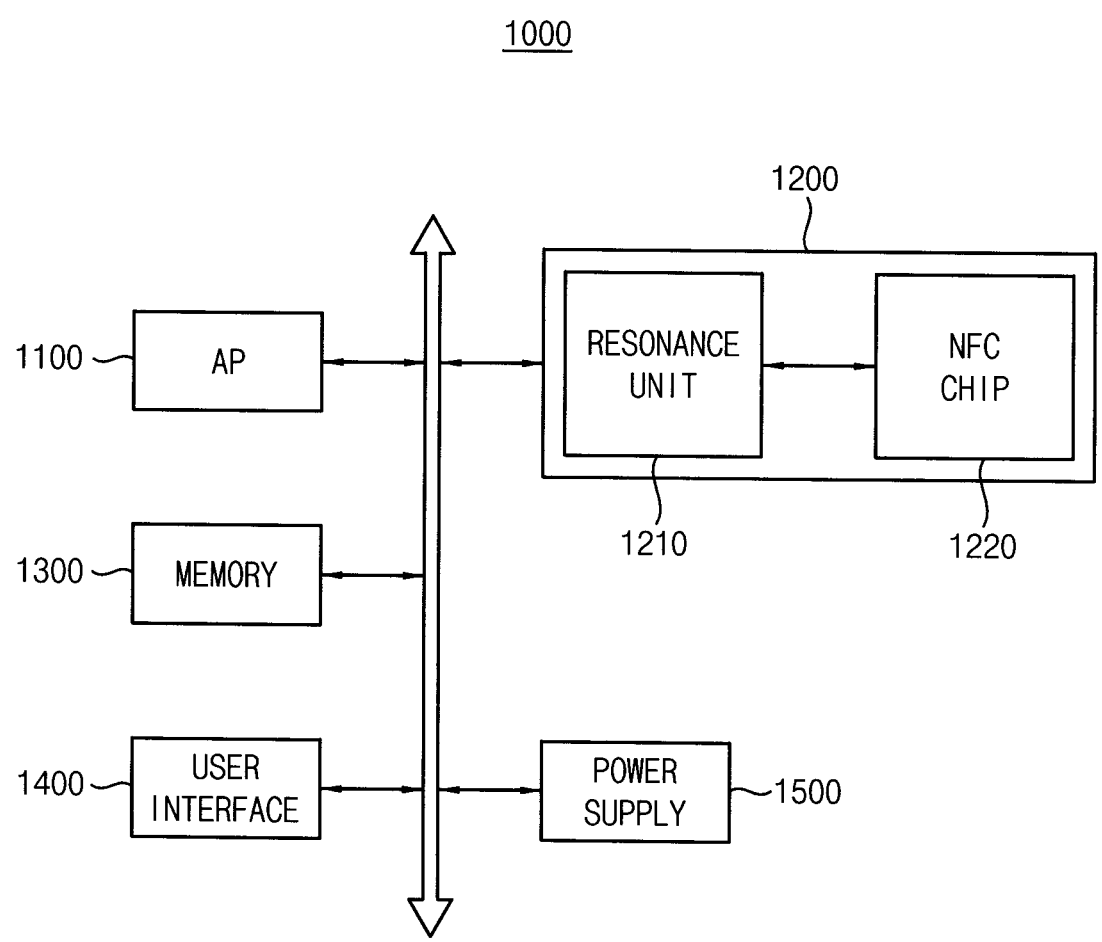
FIG. 15 is a block diagram illustrating an electronic system in accordance with an embodiment of the present invention.

FIG. 15 is a block diagram illustrating an electronic system 1000 according to an embodiment of the present invention.

Referring to FIG. 15, the electronic system 1000 includes an application processor AP 1100, an NFC device 1200, a memory device 1300, a user interface 1400 and a power supply 1500. In an embodiment of the present invention, the electronic system 1000 is a mobile system, such as a mobile phone, a smart phone, a Personal Digital Assistant (PDA), a Portable Multimedia Player (PMP), a digital camera, a camcorder, a music player, a portable game console, a navigation system, etc.

The application processor 1100 controls overall operations of the electronic system 1000. The application processor 1100 executes applications, such as a web browser, a game application, a video player, etc. In an embodiment of the present invention, the application processor 1100 includes a single core or multiple cores. For example, the application processor 1100 may be a multi-core processor, such as a dual-core processor, a quad-core processor, a hexa-core processor, etc. The application processor 1100 may include an internal or external cache memory.

The memory device 1300 stores various data. For example, the memory device 1300 may store a boot image for booting the electronic system 1000. In an embodiment of the present invention, the memory device 1300 is an Electrically Erasable Programmable Read-Only-Memory (EEPROM), a flash memory, a Phase Change Random Access Memory (PRAM), a Resistance Random Access Memory (RRAM), a Nano Floating Gate Memory (NFGM), a Polymer Random Access Memory (PoRAM), a Magnetic Random Access Memory (MRAM), a Ferroelectric Random Access Memory (FRAM), etc.

The NFC device 1200 transmits output data stored in the memory device 1300 to an external device through NFC. The NFC device 1200 receives input data from the external device through NFC and stores the input data in the memory device 1300. The NFC device 1200 includes a resonance unit 1210 and an NFC integrated circuit, or chip, 1220. The resonance unit 1210 emits an electromagnetic wave in reader mode to transmit output data to an external NFC card and to receive input data from an external NFC card. The resonance unit 1210 generates an antenna voltage through a mutual induction with an external NFC card while the resonance unit 1210 emits an electromagnetic wave. The NFC chip 1220 measures the antennal voltage generated by the resonance unit 1210 while the resonance unit 1210 emits an electromagnetic wave, and determines whether an external NFC reader is in the vicinity of the NFC device 1200 based on a magnitude of the antenna voltage. When the magnitude of the antenna voltage oscillates while the resonance unit 1210 emits an electromagnetic wave, the NFC chip 1220 determines that the external NFC reader is in the vicinity of the NFC device 1200 and controls the resonance unit 1210 to stop emitting the electromagnetic wave. Then, the NFC chip 1220 operates in card mode.

The NFC device 1200 of FIG. 15 may be the NFC device 10 of FIG. 1. The NFC device 10 of FIG. 1 is described above with reference to FIGS. 1 to 14. Therefore, a detail description of the NFC device 1200 is omitted.

The user interface 1400 includes at least one input device, such as a keypad, a touch screen, etc., and at least one output device, such as a speaker, a display device, etc. The power supply 1500 supplies a power supply voltage to the electronic system 1000.

In an embodiment of the present invention, the electronic system 1000 may further include an image processor, and/or a storage device, such as a memory card, a Solid State Drive (SSD), a Hard Disk Drive (HDD), a Compact Disk ROM (CD-ROM), etc.

In an embodiment of the present invention, the electronic system 1000 and/or components of the electronic system 1000 are packaged in various forms, such as Package on Package (PoP), Ball Grid Arrays (BGAs), Chip Scale Packages (CSPs), Plastic Leaded Chip Carrier (PLCC), Plastic Dual In-line Package (PDIP), die in waffle pack, die in wafer form, Chip On Board (COB), CERamic Dual In-line Package (CERDIP), Plastic Metric Quad Flat Pack (MQFP), Thin Quad Flat Pack (TQFP), Small Outline Integrated Circuit (SOIC), Shrink Small Outline Package (SSOP), Thin Small Outline Package (TSOP), System In Package (SIP), Multi Chip Package (MCP), Wafer-Level Fabricated Package (WFP), or Wafer-level processed Stack Package (WSP).

The foregoing is illustrative of the present invention and is not to be construed as limiting thereof. Although embodiments of the present invention are described, those skilled in the art will readily appreciate that many modifications are possible in the embodiments without materially departing from the spirit and scope of the present invention. Accordingly, all such modifications are intended to be included within the scope of the present invention as defined in the claims and their equivalents. Therefore, it is to be understood that the foregoing is illustrative of embodiments of the present invention and is not to be construed as limited to the embodiments of the present invention disclosed, and that modifications to the disclosed embodiments of the present invention, as well as other embodiments of the present invention, are intended to be included within the scope of the appended claims and their equivalents.

What is claimed is:

1. A Near Field Communication (NFC) device, comprising:
   a resonance unit configured to emit a first electromagnetic wave to communicate with an external NFC card in a reader mode; and
   an NFC chip configured to measure an antenna voltage generated by the resonance unit while the resonance unit emits the first electromagnetic wave, and to control the resonance unit to stop emitting the first electromagnetic wave when a magnitude of the antenna voltage oscillates,
   wherein the NFC chip includes:
   a collision detection unit configured to activate an increase signal when the magnitude of the antenna voltage received from the resonance unit through a power electrode is greater than or equal to a reference value by at least a positive threshold value, and to activate a decrease signal when the magnitude of the antenna voltage received from the resonance unit through the power electrode is smaller than the reference value by at least a negative threshold value; and
   a Central Processor Unit (CPU) configured to control the resonance unit to stop emitting the first electromagnetic wave when the increase signal and the decrease signal are alternately activated.

2. The NFC device of claim 1, wherein the NFC chip is further configured to provide an output current to the resonance unit, the resonance unit is configured to emit the first electromagnetic wave based on the output current, and the NFC chip is further configured to measure the antenna voltage while the resonance unit emits the first electromagnetic wave and to stop providing the output current to the resonance unit to switch from the reader mode to a card mode when the magnitude of the antenna voltage oscillates.

3. The NFC device of claim 1, wherein, when the resonance unit receives a second electromagnetic wave emitted from an external NFC reader while the resonance unit emits the first electromagnetic wave, the resonance unit is further configured to generate the antenna voltage having an oscillating magnitude based on an interference between the first electromagnetic wave and the second electromagnetic wave.

4. The NFC device of claim 1, wherein the NFC chip further includes:
   a transmit unit configured to provide an output current to the resonance unit through a transmission electrode in the reader mode, and to stop generating the output current in a card mode, wherein the CPU is further configured to switch an operation mode from the reader mode to the card mode when the increase signal and the decrease signal are alternatively activated.

5. The NFC device of claim 4, wherein the transmit unit includes:
   a first pull-up transistor coupled between a supply voltage and a first transmission electrode;
   a first pull-down transistor coupled between a ground voltage and the first transmission electrode;
   a second pull-up transistor coupled between the supply voltage and a second transmission electrode;
   a second pull-down transistor coupled between the ground voltage and the second transmission electrode; and
   a driving unit configured to turn off the first pull-up transistor, the first pull-down transistor, the second pull-up transistor, and the second pull-down transistor in the card mode, and to turn on the first pull-up transistor and the second pull-down transistor and turn off the first pull-down transistor and the second pull-up transistor, or turn on the first pull-down transistor and the second pull-up transistor and turn off the first pull-up transistor and the second pull-down transistor based on output data in the reader mode.

6. The NFC device of claim 1, wherein the collision detection unit is further configured to:
measure the magnitude of the antenna voltage at an initial stage of the reader mode;
store the magnitude of the antenna voltage measured at the initial stage of the reader mode as the reference value; and
periodically measure the magnitude of the antenna voltage to compare the magnitude of the antenna voltage with the reference value.

7. The NFC device of claim 1, wherein the CPU is further configured to provide the positive threshold value and the negative threshold value to the collision detection unit.

8. The NFC device of claim 1, wherein the collision detection unit includes:
a sensing unit configured to generate a Direct Current (DC) voltage proportional to the magnitude of the antenna voltage;
an analog-to-digital conversion unit configured to periodically generate a digital value by periodically performing an analog-to-digital conversion on the DC voltage; and
a determination unit configured to store the digital value received from the analog-to-digital conversion unit at an initial stage of the reader mode as the reference value, activate the increase signal when the digital value, which is periodically provided from the analog-to-digital conversion unit, is greater than or equal to the reference value by at least the positive threshold value, and activate the decrease signal when the digital value, which is periodically provided from the analog-to-digital conversion unit, is smaller than the reference value by at least the negative threshold value.

9. The NFC device of claim 8, wherein the sensing unit includes:
a rectification circuit coupled between the power electrode and a first node, the rectification circuit configured to rectify the antenna voltage received through the power electrode;
a first resistor coupled between the first node and a second node; and
a second resistor coupled between the second node and a ground voltage,
wherein the sensing unit is configured to output the DC voltage via the second node.

10. The NFC device of claim 8, wherein the sensing unit includes:
a rectification circuit coupled between the power electrode and a first node, the rectification circuit configured to rectify the antenna voltage received through the power electrode; and
a current source coupled between the first node and a ground voltage, the current source configured to generate a current having a constant magnitude,
wherein the sensing unit is further configured to output the DC voltage via the first node.

11. A Near Field Communication (NFC) device, comprising:

a resonance unit configured to emit a first electromagnetic wave to communicate with an external NFC card in a reader mode; and
an NFC chip configured to measure an antenna voltage generated by the resonance unit while the resonance unit emits the first electromagnetic wave, and to control the resonance unit to stop emitting the first electromagnetic wave when a magnitude of the antenna voltage oscillates,
wherein the NFC chip includes:
a collision detection unit configured to periodically measure the magnitude of the antenna voltage received from the resonance unit through a power electrode to periodically generate a digital value corresponding to the antenna voltage; and
a Central Processing Unit (CPU) configured to control the resonance unit to stop emitting the first electromagnetic wave when the digital value, which is periodically provided from the collision detection unit, is greater than or equal to a reference value by at least a positive threshold value and is smaller than the reference value by at least a negative threshold value alternately.

12. The NFC device of claim 11, wherein the NFC chip further includes a transmit unit configured to provide an output current to the resonance unit through a transmission electrode in the reader mode, and to stop generating the output current in a card mode, and
wherein the CPU is further configured to:
store the digital value received from the collision detection unit at an initial stage of the reader mode as the reference value; and
switch an operation mode from the reader mode to the card mode when the digital value, which is periodically provided from the collision detection unit, is greater than or equal to the reference value by at least the positive threshold value and is smaller than the reference value by at least the negative threshold value alternately.

13. The NFC device of claim 11, wherein the collision detection unit includes:
a sensing unit configured to generate a Direct Current (DC) voltage proportional to the magnitude of the antenna voltage; and
an analog-to-digital conversion unit configured to periodically generate the digital value by periodically performing an analog-to-digital conversion on the DC voltage.

14. An electronic system, comprising:
a Near Field Communication (NFC) device configured to communicate with an external device through NFC;
a memory device configured to store output data and input data; and
an application processor configured to control operations of the NFC device and the memory device,
wherein the NFC device includes:
a resonance unit configured to emit an electromagnetic wave to transmit the output data to an external NFC card and to receive input data from the external NFC card in a reader mode; and
an NFC chip configured to measure an antenna voltage generated by the resonance unit while the resonance unit emits the electromagnetic wave, and to control the resonance unit to stop emitting the electromagnetic wave when a magnitude of the antenna voltage oscillates, wherein the NFC chip includes:
a collision detection unit configured to activate an increase signal when the magnitude of the antenna voltage received from the resonance unit through a power electrode is greater than or equal to a reference value by at least a positive threshold value, and to activate a decrease signal when the magnitude of the antenna voltage received from the resonance unit through the power electrode is smaller than the reference value by at least a negative threshold value; and
a Central Processing Unit (CPU) configured to control the resonance unit to stop emitting the first electromagnetic wave when the increase signal and the decrease signal are alternately activated.

15. A Near Field Communication (NFC) method, comprising:
emitting, by a resonance unit, a first electromagnetic wave to communicate with an external NFC card in a reader mode;
measuring, by an NFC chip, an antenna voltage generated by the resonance unit while the resonance unit emits the first electromagnetic wave, wherein the NFC chip is configured to control the resonance unit to stop emitting the first electromagnetic wave when a magnitude of the antenna voltage oscillates;
activating, by a collision detection unit in the NFC chip, an increase signal when the magnitude of the antenna voltage received from the resonance unit through a power electrode is greater than or equal to a reference value by at least a positive threshold value;
activating, by the collision detection unit, a decrease signal when the magnitude of the antenna voltage received from the resonance unit through the power electrode is smaller than the reference value by at least a negative threshold value; and
controlling, by a Central Processing Unit (CPU) in the NFC chip, the resonance unit to stop emitting the first electromagnetic wave when the increase signal and the decrease signal are alternately activated.

16. The NFC method of claim 15, further comprising:
providing, by the NFC chip, an output current to the resonance unit;
emitting, by the resonance unit, the first electromagnetic wave based on the output current; and
measuring, by the NFC chip, the antenna voltage while the resonance unit emits the first electromagnetic wave and stopping providing the output current to the resonance unit to switch from the reader mode to a card mode when the magnitude of the antenna voltage oscillates.

17. The NFC method of claim 15, wherein, when the resonance unit receives a second electromagnetic wave emitted from an external NFC reader while the resonance unit emits the first electromagnetic wave, generating, by the resonance unit, the antenna voltage having a magnitude oscillating based on an interference between the first electromagnetic wave and the second electromagnetic wave.

18. The NFC method of claim 15, wherein the NFC method further includes:
providing, by a transmit unit in the NFC chip, an output current to the resonance unit through a transmission electrode in the reader mode, and stopping generating the output current in a card mode; and
switching, by the CPU, an operation mode from the reader mode to the card mode when the increase signal and the decrease signal are alternately activated.

19. A Near Field Communication (NFC) method, comprising:
emitting, by a resonance unit, a first electromagnetic wave to communicate with an external NFC card in a reader mode;
measuring, by an NFC chip, an antenna voltage generated by the resonance unit while the resonance unit emits the first electromagnetic wave, wherein the NFC chip is configured to control the resonance unit to stop emitting the first electromagnetic wave when a magnitude of the antenna voltage oscillates;
periodically measuring, by a collision detection unit in the NFC chip, the magnitude of the antenna voltage received from the resonance unit through a power electrode to periodically generate a digital value corresponding to the antenna voltage; and
controlling, by a Central Processing Unit (CPU) in the NFC chip, the resonance unit to stop emitting the first electromagnetic wave when the digital value, which is periodically provided from the collision detection unit, is greater than or equal to a reference value by at least a positive threshold value and is smaller than the reference value by at least a negative threshold value alternately.

* * * * *